United States Patent
Baba et al.

(10) Patent No.: US 7,245,832 B2
(45) Date of Patent: Jul. 17, 2007

(54) RADIO COMMUNICATION APPARATUS

(75) Inventors: Tomo Baba, Ashigarakami-gun (JP); Masao Funada, Ashigarakami-gun (JP); Takeshi Kamimura, Ashigarakami-gun (JP); Hidenori Yamada, Ashigarakami-gun (JP); Junji Okada, Ashigarakami-gun (JP); Shinya Kyozuka, Ashigarakami-gun (JP); Kazuhiro Sakai, Ashigarakami-gun (JP); Tsutomu Hamada, Ashigarakami-gun (JP); Shinobu Ozeki, Ashigarakami-gun (JP); Osamu Takanashi, Ashigarakami-gun (JP); Masaaki Miura, Ashigarakami-gun (JP); Takehiro Niitsu, Ashigarakami-gun (JP); Masashi Hisada, Ashigarakami-gun (JP); Kenichi Kobayashi, Ashigarakami-gun (JP); Akira Toshima, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 717 days.

(21) Appl. No.: 10/068,959

(22) Filed: Feb. 11, 2002

(65) Prior Publication Data
US 2003/0002107 A1 Jan. 2, 2003

(30) Foreign Application Priority Data
Jun. 29, 2001 (JP) .............................. 2001-198009

(51) Int. Cl.
*H04B 10/20* (2006.01)
*H04B 10/12* (2006.01)
*H04B 10/00* (2006.01)

(52) U.S. Cl. .......................... 398/60; 398/142; 398/165

(58) Field of Classification Search ........ 398/141–142, 398/164, 165, 60
See application file for complete search history.

(56) References Cited

U.S. PATENT DOCUMENTS 5,477,363 A * 12/1995 Matsuda ...................... 398/48
5,870,668 A 2/1999 Takano et al.
6,332,050 B1 * 12/2001 Feldman et al. .............. 385/24
6,374,020 B1 * 4/2002 Paniccia ...................... 385/47
6,628,441 B1 * 9/2003 Staiger ....................... 398/164

FOREIGN PATENT DOCUMENTS

EP        0 984 640 A2    3/2000

(Continued)

OTHER PUBLICATIONS

"Computer Networks" by A. Tanenbaum, Prentice-Hall 1981, pp. 103-104.*

(Continued)

*Primary Examiner*—Shi K. Li
(74) *Attorney, Agent, or Firm*—Oliff & Berridge PLC

(57) ABSTRACT

An optical bus 30 optically connects each board of a signal processing section 22 and each board of a transmission/reception section 40 for transmitting an optical signal output to the optical bus 30 by each board of the signal processing section 22 to each board of the transmission/reception section 40 in a non-block state. In contrast, the optical bus 30 transmits an optical signal output to the optical bus 30 by each board of the transmission/reception section 40 to each board of the signal processing section 22 in a non-block state.

6 Claims, 15 Drawing Sheets

FOREIGN PATENT DOCUMENTS

| | | |
|---|---|---|
| EP | 1 089 579 A1 | 9/2000 |
| GB | 2 307 059 A | 5/1997 |
| JP | A-9-64780 | 3/1997 |
| JP | A-9-184941 | 7/1997 |
| JP | A-9-200167 | 7/1997 |
| JP | A-11-41172 | 2/1999 |
| JP | A 2000-22626 | 1/2000 |
| JP | A 2000-36982 | 2/2000 |
| JP | A-2000-329962 | 11/2000 |
| JP | A 2001-16159 | 1/2001 |
| JP | A-2001-74966 | 3/2001 |
| JP | A-2001-84181 | 3/2001 |
| JP | 2001-147351 * | 5/2001 |
| JP | A-2001-147351 | 5/2001 |
| JP | A-2002-511673 | 4/2002 |
| JP | A-2002-515682 | 5/2002 |
| WO | WO 98/39861 * | 9/1998 |
| WO | WO 99/52308 | 10/1999 |
| WO | WO 99/59270 | 11/1999 |

OTHER PUBLICATIONS

"Understanding Data Communication" by G. Friend et al., Texas Instruments Inc., 1984, pp. 4-8 throuth 4-13.*

Ozeki et al., "Novel Concept, Optical sheet bus technology", ELECTRONICS, Ohmsha, vol. 45, No. 10, Oct. 1, 2000, pp. 50-53, (with partial translation).

Widmer et al., "A DC-Balanced, Partitioned-Block, 8B/10B Transmission Code", IBM J. Res. Develop., vol. 27, No. 5, Sep. 1983, pp. 440-451.

* cited by examiner

SIGNAL PROCESSING CIRCUIT 24 OR TRX42

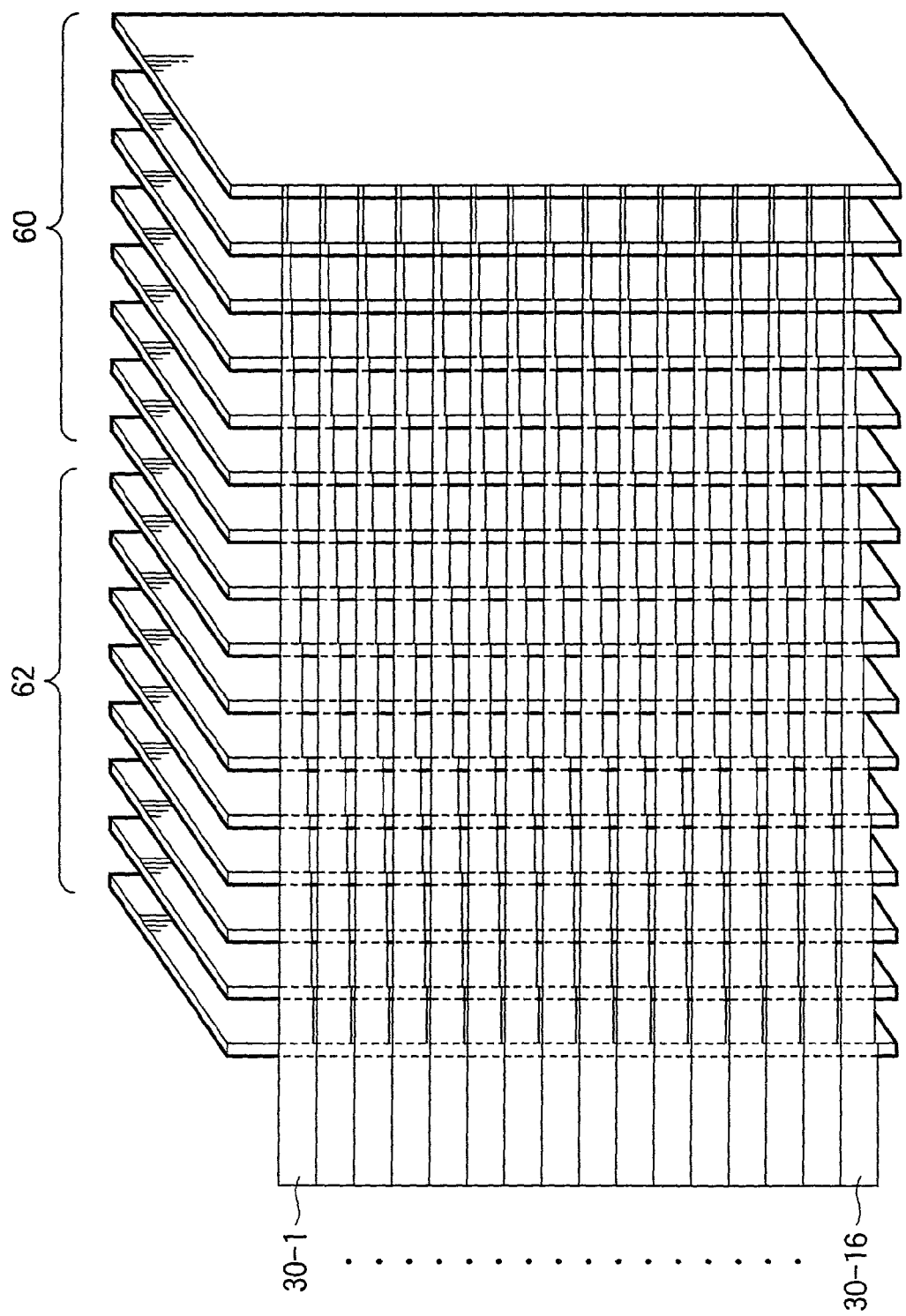

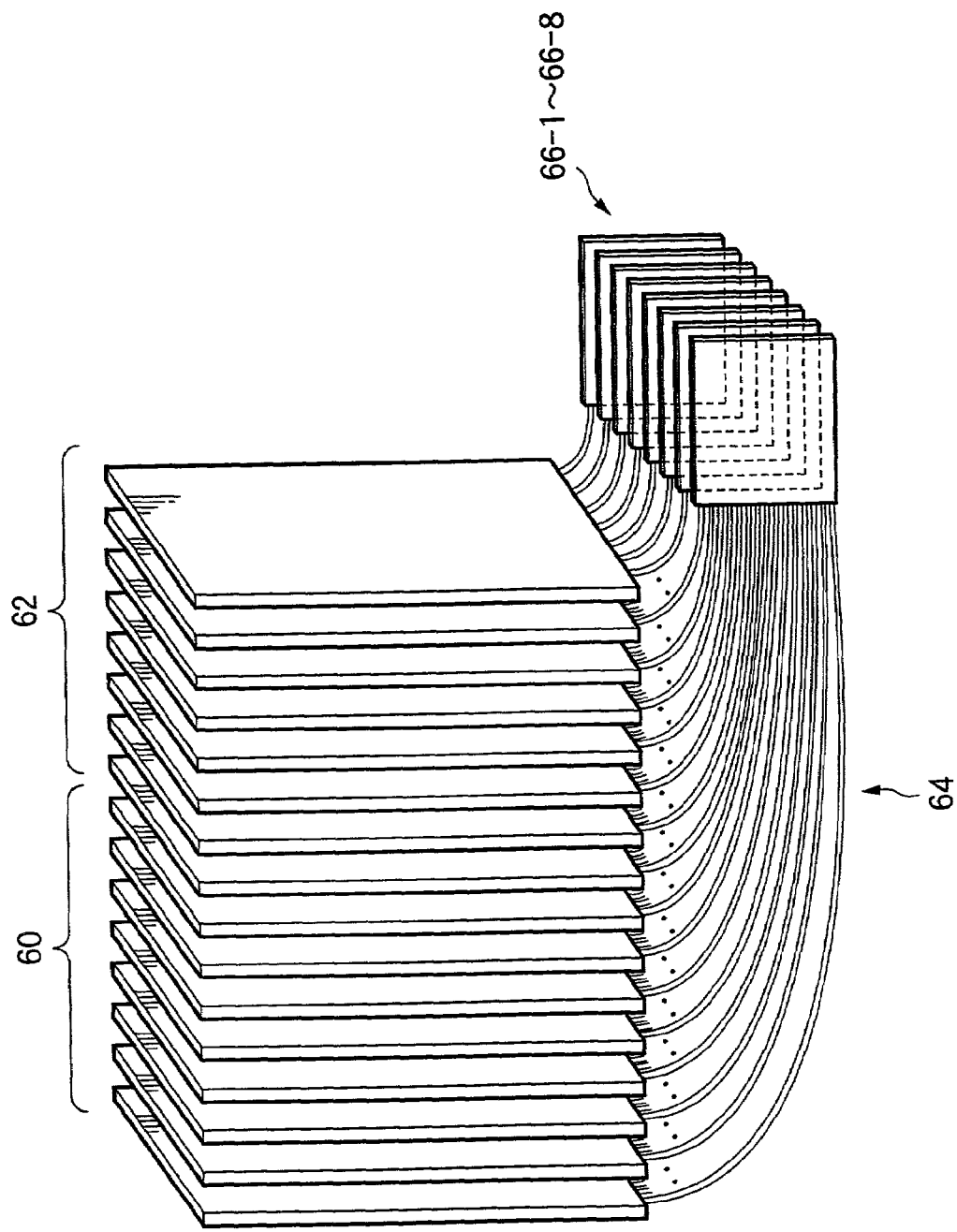

RADIO COMMUNICATION APPARATUS

BACKGROUND OF THE INVENTION

1. Field of the Invention

This invention relates to a radio communication apparatus used as a base station, etc., of a mobile communication system.

2. Description of the Related Art

In a mobile communication system such as mobile telephones, a large number of base stations and exchanges are connected via a network and each base station transmits and receives a signal to and from a mobile station (mobile telephone) via a radio communication channel.

As disclosed in JP-A-2000-36982, JP-A-2000-22626, and JP-A-2001-16159, such a base station comprises a large number of transceivers for transmitting and receiving signals via radio channels and a large number of signal processors for processing signals between the transceivers and a network, the transceivers and the signal processors being connected to each other in a non-block state.

For example, if an attempt is made to connect eight transceivers and eight signal processors directly to each other with metallic paired cables as transmission lines, a total of 128 (8×8×2) paired cables are required because it is necessary to transmit signals bidirectionally between each of the eight transceivers and each of the eight signal processors.

Further, if an attempt is made to transmit a signal at high speed using a plurality of transmission lines between each transceiver and each signal processor, more paired cables are required.

Thus, to connect the transceivers and the signal processors, many lines need to be used for wiring and the number of pins of connectors to connect the boards of the transceivers and the signal processors to a cabinet is increased following the wiring amount.

This introduces not only a problem of a pin bottleneck of each board, but also a problem of the necessity for a very large force (several tens of kg) when each board is inserted or removed.

If an attempt is made to connect the boards of the transceivers and the signal processors through a back panel, wiring of the back panel becomes very complicated and moreover a large number of layers (ten and several layers) must be stacked on each other.

SUMMARY OF THE INVENTION

It is therefore an object of the invention to provide a radio communication apparatus for making it possible to decrease the number of wires between signal processing units and radio signal transmission/reception units in each base station of a mobile communication system.

It is another object of the invention to provide a radio communication apparatus wherein the number of wires and the thickness of a back panel for connecting signal processors and radio transceivers are reduced in each base station of a mobile communication system.

It is another object of the invention to provide a radio communication apparatus wherein a pin bottleneck of connectors for fixing signal processors and radio signal transceivers to a back panel is eliminated to decrease the force required for inserting or removing each board in each base station of a mobile communication system.

First Radio Communication Apparatus

To the ends, according to the invention, there is provided a first radio communication apparatus comprising a plurality of radio signal reception section adapted to receive a signal from a radio communication channel; a plurality of reception signal processing section adapted to process the received signal; and an optical transmission section adapted to optically transmit the received signal from the plurality of radio signal reception sections to the plurality of reception signal processing sections, respectively.

Preferably, each of radio signal reception sections comprises a first signal conversion section adapted to convert the received signal into at least one optical signal; the optical transmission section comprises: at least one optical bus adapted to connect the plurality of radio signal reception section and the plurality of reception signal processing section and to guide each of at least one optical signal from each of plurality of radio signal reception sections to each of plurality of reception signal processing sections; at least one first light guide section adapted to guide each of at least one optical signal from each of plurality of radio signal reception sections to each of at least one optical bus; and at least one second light guide section adapted to guide each of at least one optical signal from each of at least one optical bus to each of plurality of reception signal processing sections, each of plurality of reception signal processing sections comprises a second signal conversion section adapted to convert the at least one guided optical signal into the received signal.

Preferably, the optical bus comprises an optical signal diffusion section adapted to diffuse the optical signal from each of at least one first light guide section to guide to each of at least one second light guide section.

Preferably, the at least one first light guide section reflects each of at least one optical signal from each of plurality of radio signal reception sections to guide to the optical bus.

Preferably, each of at least one second light guide section reflects each of at least one optical signal guided through each of at least one optical bus to guide each of at least one optical signal to each of plurality of reception signal processing sections.

Preferably, each of at least one first light guide section is an optical fiber adapted to guide each of at least one optical signal from each of plurality of radio signal reception sections.

Preferably, each of at least one second light guide section is an optical fiber adapted to guide each of at least one optical signal guided through each of at least one optical bus to each of plurality of reception signal processing sections.

Second Radio Communication Apparatus

According to the invention, there is provided a second radio communication apparatus comprising: a plurality of transmission signal processing sections adapted to process a signal to be transmitted, respectively; a plurality of radio signal transmission section adapted to transmit the processed signal to a radio communication channel, respectively; and an optical transmission section adapted to optically transmit the processed signal from each of plurality of transmission signal processing sections to each of plurality of radio signal transmission sections.

Preferably, each of plurality of transmission signal processing sections comprises a third signal conversion section adapted to convert the processed signal into at least one optical signal; the optical transmission section comprises: at least one optical bus adapted to connect the plurality of transmission signal processing sections and the plurality of radio signal transmission sections to guide each of at least one optical signal from each of plurality of transmission signal processing sections to each of plurality of radio signal transmission sections; at least one third light guide section adapted to guide each of at least one optical signal from each of plurality of transmission signal processing sections to each of at least one optical bus; and at least one fourth light guide sections adapted to guide each of at least one optical signal from each of at least one optical bus to each of plurality of radio signal transmission sections; and each of plurality of radio signal transmission sections comprises a fourth signal conversion section adapted to convert the at least one optical signal into the processed signal.

Preferably, the optical bus comprises an optical signal diffusion section adapted to diffuse each of at least one optical signal from each of at least one third light guide section to guide each of at least one optical signal to each of at least one fourth light guide section.

Preferably, each of at least one third light guide section reflects the at least one optical signal from each of plurality of transmission signal processing sections to guide the at least one optical signal to each of the at least one optical buses.

Preferably, each of at least one fourth light guide section reflects each of the at least one optical signal guided through each of at least one optical bus to guide each of at least one optical signal to each of plurality of radio signal transmission sections.

Preferably, each of at least one third light guide section is an optical fiber adapted to guide each of at least one optical signals from each of plurality of transmission signal processing sections.

Preferably, each of at least one fourth light guide section is an optical fiber adapted to guide each of at least one optical signal guided through the at least one optical bus to each of plurality of radio signal transmission sections.

Third Radio Communication Apparatus

According to the invention, there is provided a third radio communication apparatus comprising: a plurality of radio signal reception sections adapted to receive a signal from a radio communication channel, respectively; a plurality of reception signal processing sections adapted to process the received signal, respectively; a plurality of transmission signal processing sections adapted to process a signal to be transmitted, respectively; a plurality of radio signal transmission sections adapted to transmit the processed signal to a radio communication channel, respectively; and an optical transmission section adapted to optically transmit the received signal from each of plurality of radio signal reception sections to each of plurality of reception signal processing sections and to optically transmit the processed signal from each of plurality of transmission signal processing sections to each of plurality of radio signal transmission sections.

Preferably, each of plurality of radio signal reception sections comprises a first signal conversion section adapted to convert the received signal into at least one first optical signal; each of plurality of transmission signal processing sections comprises a third signal conversion section adapted to convert the processed signal into at least one second optical signal; the optical transmission section comprises: at least one optical bus adapted to connect the plurality of radio signal reception sections, the plurality of reception signal processing sections, the plurality of transmission signal processing sections, and the plurality of radio signal transmission sections to guide each of at least one first optical signal from each of plurality of radio signal reception sections to each of plurality of reception signal processing sections and to guide each of at least one second optical signals from each of plurality of transmission signal processing sections to each of plurality of radio signal transmission sections; at least one first light guide section adapted to guide each of at least one first optical signal from each of plurality of radio signal reception sections to each of at least one optical bus; at least third light guide section adapted to guide the at least one optical signal from each of plurality of transmission signal processing sections to each of at least one optical bus; at least one second light guide section adapted to guide the at least one optical signal from each of at least one optical bus to each of plurality of reception signal processing sections; and at least one fourth light guide section each for guiding the at least one optical signal from each of at least one optical bus to each of plurality of radio signal transmission sections, each of plurality of reception signal processing sections comprises a second signal conversion section adapted to convert the at least one first optical signals into the received signal; and each of plurality of radio signal transmission sections comprises a fourth signal conversion section adapted to convert the at least one second optical signal into the processed signal.

Preferably, the optical bus comprises an optical signal diffusion section adapted to diffuse each of at least one first optical signal from each of at least one first light guide section and each of at least one second optical signal from each of at least one third light guide section to guide each of at least one first optical signal to each of at least one second light guide section and each of at least one second optical signal to each of at least one fourth light guide section.

Preferably, the plurality of reception signal processing sections and the plurality of transmission signal processing sections are formed integrally; and the at least one first light guide section and the at least one third light guide section are formed integrally to guide each of at least one first optical signal guided through each of at least one optical bus to the reception signal processing sections and to guide each of at least second optical signal from the transmission signal processing sections to each of at least one optical bus.

Preferably, the plurality of radio signal reception sections and the plurality of radio signal transmission sections are formed integrally; and the at least one second light guide section and the at least one fourth light guide section are formed integrally to guide each of at least one first optical signal from each of plurality of radio signal reception sections to each of at least one optical buses and to guide each of at least one second optical signal guided through each of at least one optical bus to the radio signal transmission sections.

Signal Processor

According to the invention, there is provided a signal processor comprising a plurality of first signal processing sections adapted to process a first signal; a plurality of second signal processing sections adapted to process a second signal; and an optical transmission section adapted to optically transmit the first and second signals between the plurality of first signal processing sections and the plurality of second signal processing sections in a non-block way.

BRIEF DESCRIPTION OF THE DRAWINGS

FIG. 18 is a drawing to show a third modified example of the base station shown in FIG. 2.

FIG. 19 is a drawing to show a fourth modified example of the base station shown in FIG. 2.

DETAILED DESCRIPTION OF THE PREFERRED EMBODIMENTS

First Embodiment

A first embodiment of the invention will be discussed.

Figure 1:
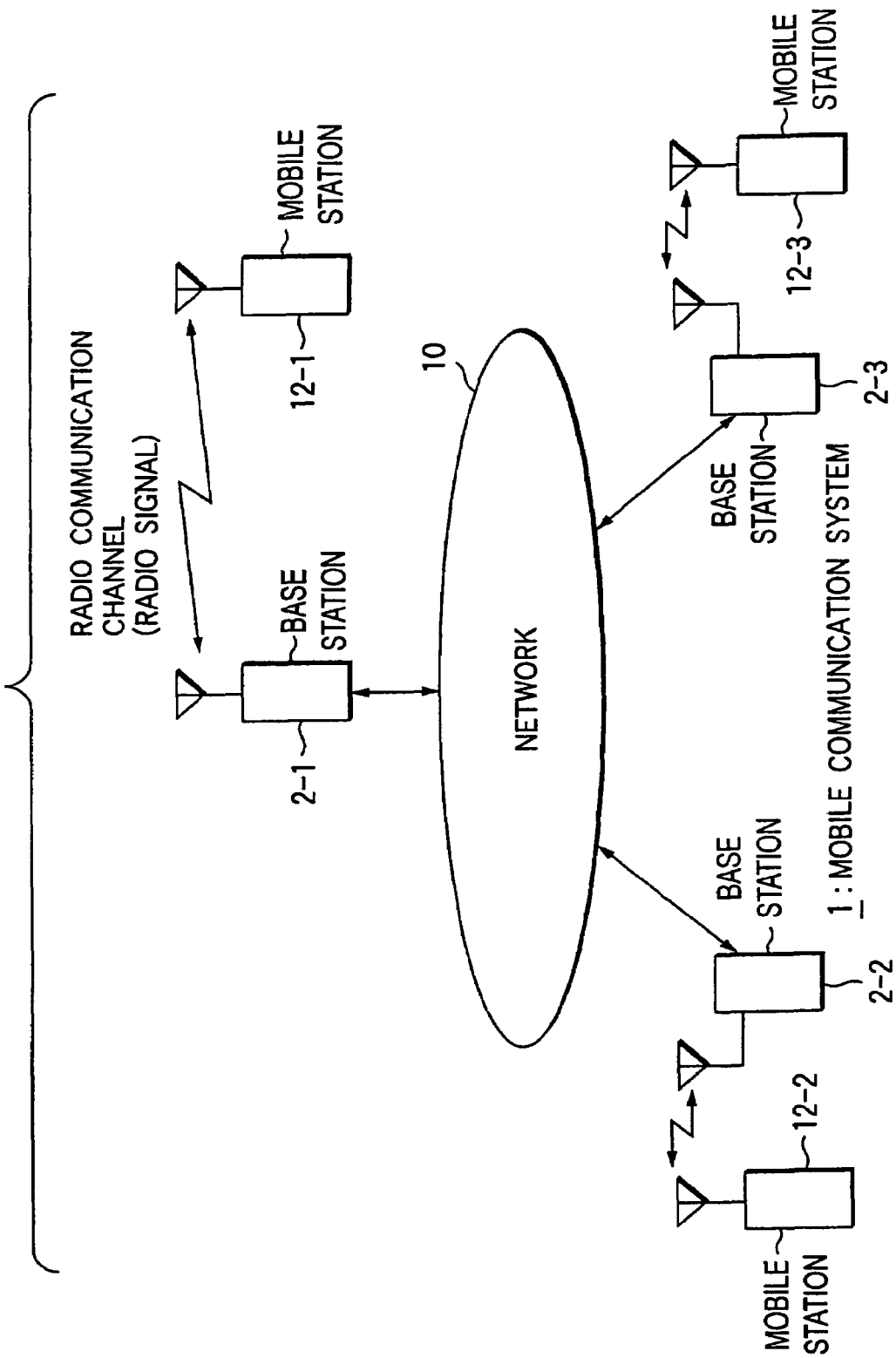
FIG. 1 is a drawing to illustrate the configuration of a mobile communication system with base stations according to the invention.

FIG. 1 is a drawing to illustrate a configuration of a mobile communication system 1 with base stations 2-1 to 2-3 according to the invention.

In the accompanying drawings, components not directly related to the description of the invention are not shown whenever necessary.

As shown in FIG. 1, the mobile communication system 1 comprises the plurality of base stations 2 connected to each other through a network 10, and the base stations 2-1 to 2-3 communicate with a plurality of mobile stations 12-1 to 12-3 over radio communication channels.

To indicate any one of a plurality of components such as "base stations 2-1 to 2-3," simply "base station 2" or the like is also described.

Figure 2:
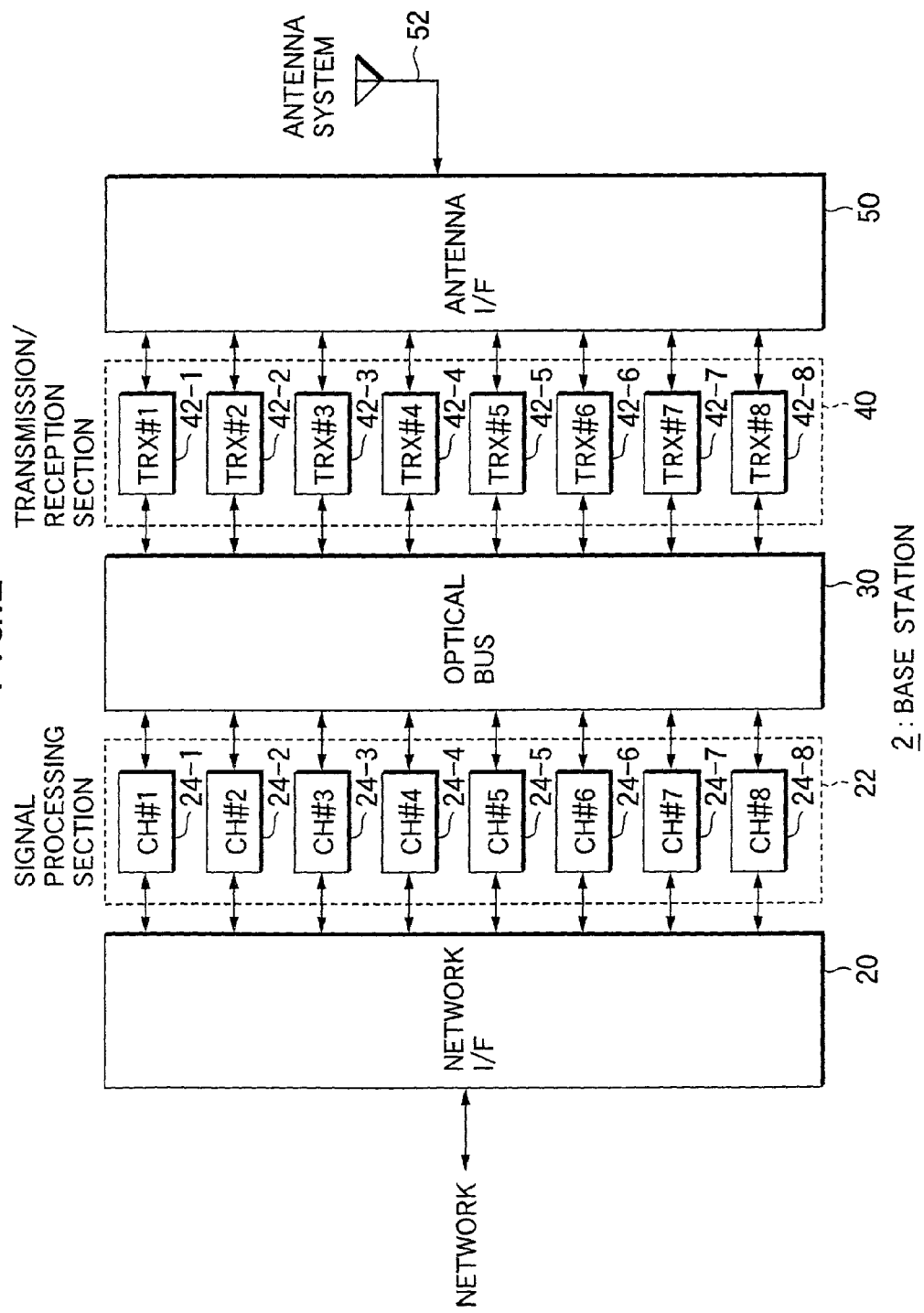
FIG. 2 is a drawing to show the configuration of the base station shown in FIG. 1.

FIG. 2 is a drawing to show a configuration of the base station 2 shown in FIG. 1.

As shown in FIG. 2, the base station 2 comprises a network interface (network IF) 20, a signal processing section 22, an optical bus 30, a transmission/reception section 40, an antenna IF 50, and an antenna system 52.

The base station 2 uses these components to process transmission data input from any other base station 2 through the network 10 and to transmit the processed transmission data to the mobile station 12 over the radio communication channel.

In contrast, the base station 2 processes reception data received from the mobile station 12 over the radio communication channel and outputs the data to another base station 2 through the network 10.

[Network IF 20]

The network IF 20 receives a plurality of pieces of transmission data in an eight-bit parallel format at 66 Mbps from the network 10, for example, and distributes the pieces of the data to signal processing circuits 24-1 to 24-8 of the signal processing section 22, respectively.

The network IF 20 receives a plurality of pieces of reception data in an eight-bit parallel format at 66 Mbps from the signal processing circuits 24-1 to 24-8 of the signal processing section 22 and outputs the pieces of the data to the network 10.

[Signal Processing Section 22 •Signal Processing Circuits 24]

Figure 3:
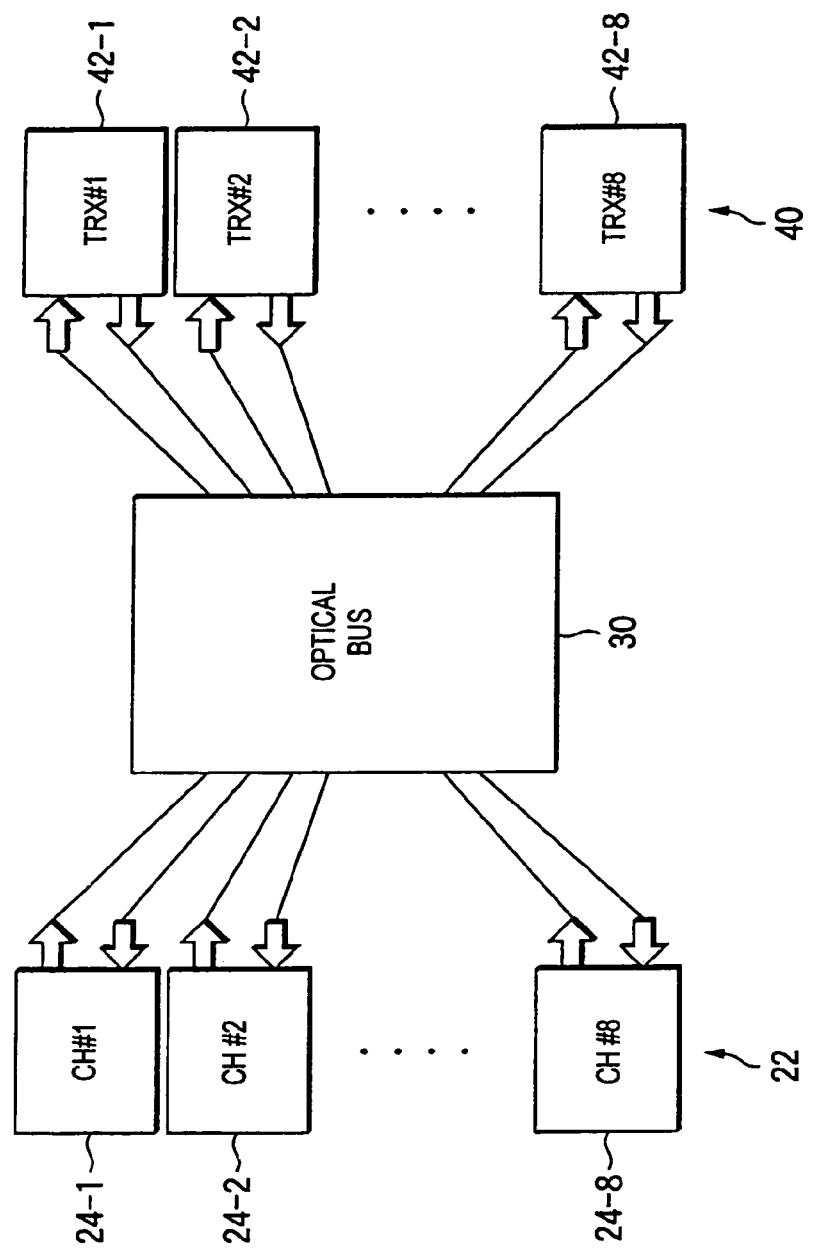
FIG. 3 is a drawing to show the connection relationships among signal processing circuits, an optical bus, and transmission/reception circuits shown in FIG. 2.

FIG. 3 is a drawing to show connection relationships among the signal processing circuits 24-1 to 24-8, the optical bus 30, and transmission/reception circuits 42-1 to 42-8 shown in FIG. 2.

The signal processing section 22 comprises the n signal processing circuits 24-1 to 24-$n$, for example, each housed in one board as shown in FIGS. 2 and 3 (in FIG. 2, n=8).

Figure 4:
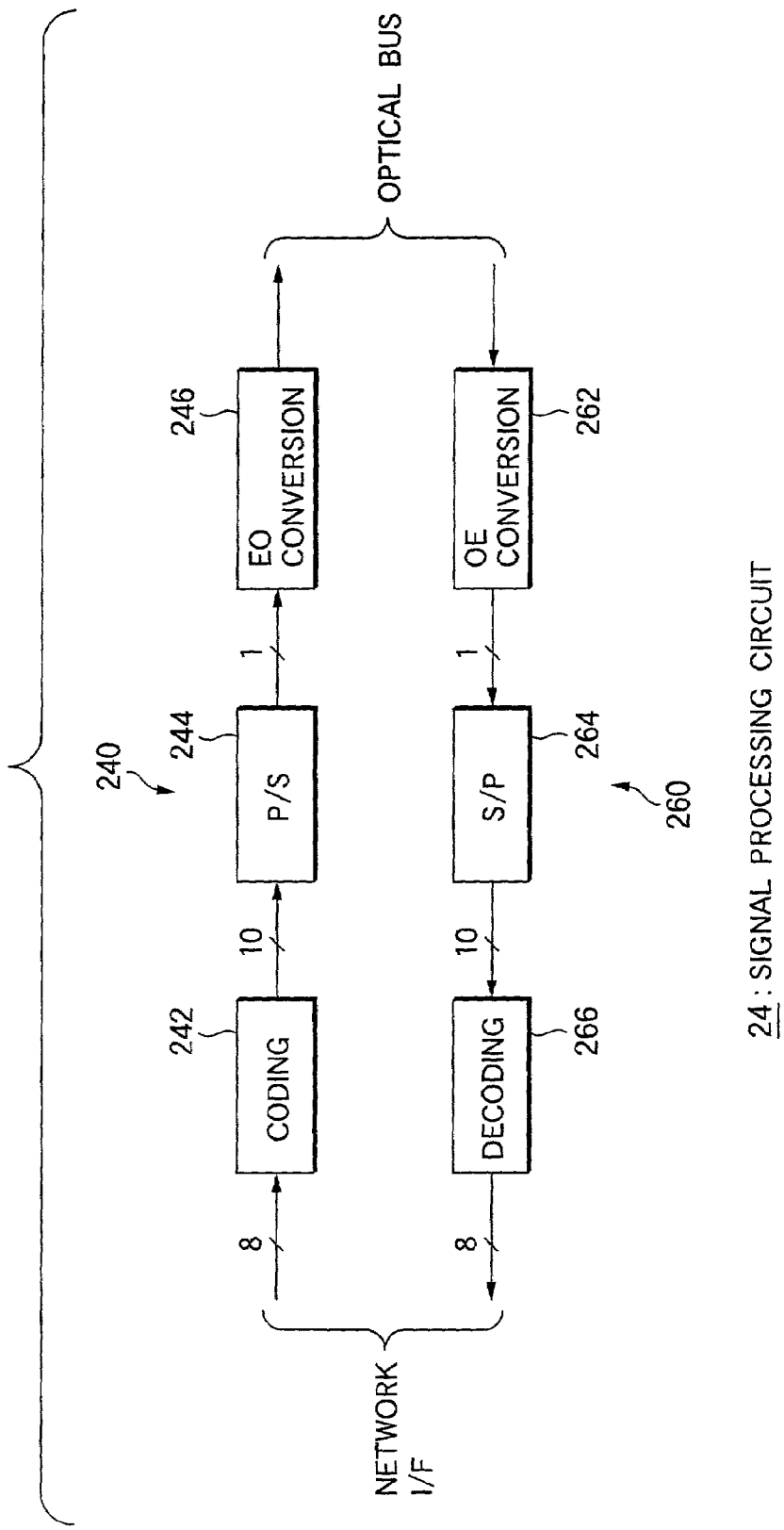
FIG. 4 is a drawing to show the configuration of the signal processing circuit shown in FIGS. 2 and 3.

FIG. 4 is a drawing to show a configuration of the signal processing circuit 24 shown in FIGS. 2 and 3.

As shown in FIG. 4, the signal processing circuit 24 comprises a transmission channel 240 and a reception channel 260.

The transmission channel 240 comprises a coding circuit 242, a parallel-serial conversion circuit (P/S conversion circuit) 244, and an electric-optical signal conversion circuit (EO conversion circuit) 246.

The reception channel 260 comprises an optical-electric signal conversion circuit (OE conversion circuit) 262, a serial-parallel conversion circuit (S/P conversion circuit) 264, and a decoding circuit 266.

The signal processing circuit 24 uses these components to code transmission data in the eight-bit parallel format at 66 Mbps input from the network IF 20 (FIG. 2) and further convert the data into data in a one-bit serial format at 66 Mbps and then output the data to the optical bus 30, as shown in FIGS. 3 and 4.

The signal processing circuit 24 decodes reception data in the one-bit serial format at 660 Mbps input from the optical bus 30 and further converts the data into data in the eight-bit parallel format at 66 Mbps and then outputs the data to the network IF 20.

[Transmission Channel 240]

In the transmission channel 240, the coding circuit 242 codes the transmission data in the eight-bit parallel format at 66 Mbps input from the network IF 20 by adding two bits for DC balance in accordance with a method, for example, disclosed in "A DC-Balanced, Partitioned-Block, 8B/10B Transmission Code, A. X. Widmer et al., IBM J.RES DEVELOP., Vol. 27, No. 5, Sep. 1983" and outputs the data to the P/S conversion circuit 244 as transmission data in a 10-bit parallel format at 66 Mbps.

The P/S conversion circuit 244 converts the transmission data in the 10-bit parallel format at 66 Mbps input from the coding circuit 240 into transmission data in a one-bit serial format at 660 Mbps and outputs the data to the EO conversion circuit 246.

The EO conversion circuit 246, which comprises electric-optical signal conversion elements such as laser diode or the like, converts the electric transmission data in the one-bit serial format at 660 Mbps input from the P/S conversion circuit 244 into an optical transmission signal and outputs the optical transmission signal to the optical bus 30.

[Reception Channel 260]

In the reception channel 260, the OE conversion circuit 262, which comprises, for example, optical-electric signal conversion elements such as photodiode or the like, converts an optical reception signal input from the optical bus 30 into electric reception data in a one-bit serial format at 660 Mbps and outputs the electric reception data to the S/P conversion circuit 264.

The S/P conversion circuit 264 converts the electric reception data in the one-bit serial format at 660 Mbps input from the optical bus through the OE conversion circuit 262 into reception data in a 10-bit parallel format at 66 Mbps and outputs the reception data to the decoding circuit 266.

The decoding circuit 266 performs inverse processing to that of the coding circuit 242, namely, removes the two bits added to strike DC balance from the reception data in the 10-bit parallel format at 66 Mbps to form the reception data in the eight-bit parallel format at 66 Mbps and outputs the reception data to the network IF 20.

[Optical Bus 30]

Figure 5:
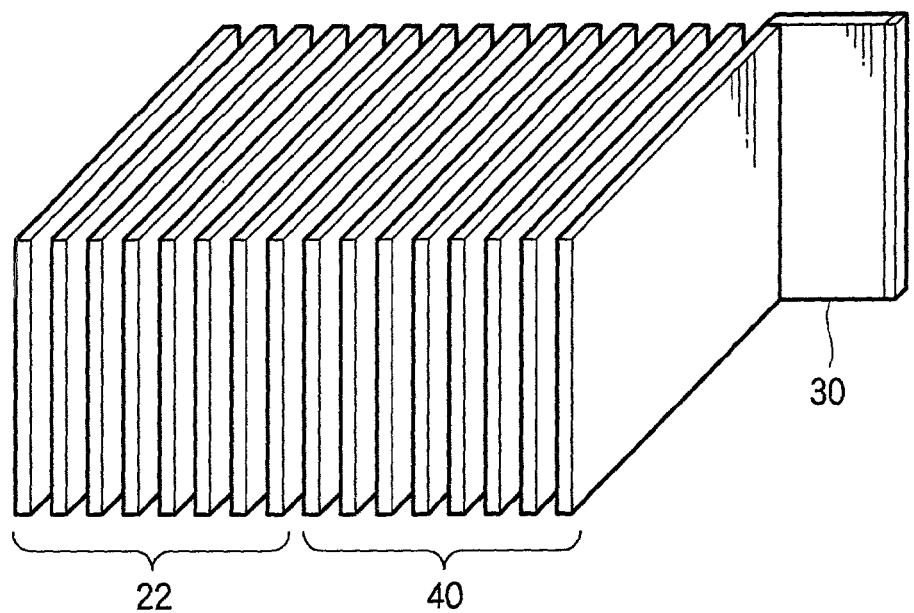
FIG. 5 is a front view of the optical bus installing the signal processing section and the transmission/reception section shown in FIG. 2, etc.

FIG. 5 is a front view of the optical bus 30 mounted the signal processing section 22 and the transmission/reception section 40 therein shown in FIG. 2, etc.

Figure 6:
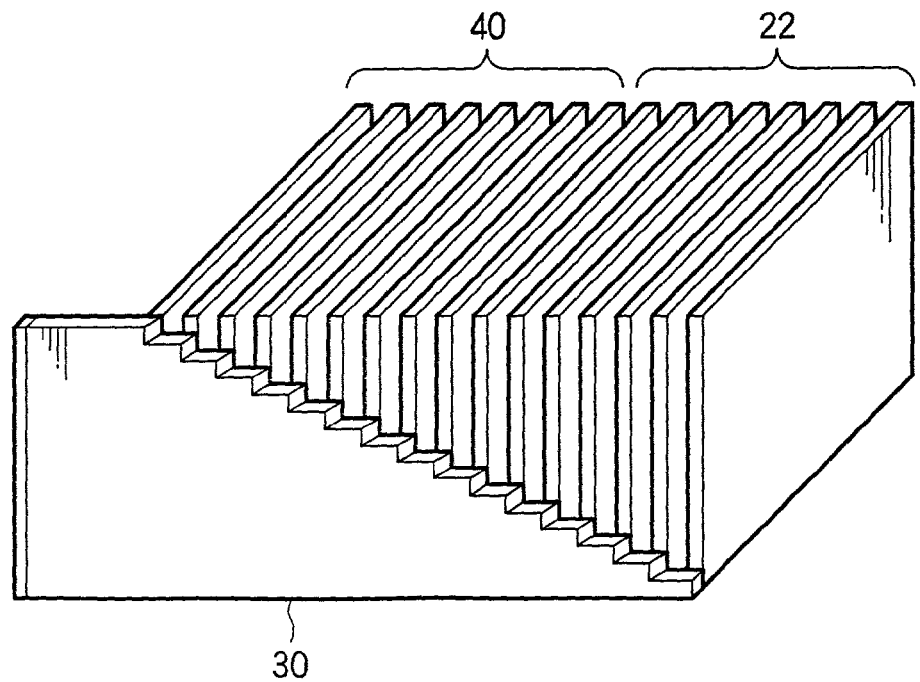
FIG. 6 is a rear view of the optical bus installing the signal processing section and the transmission/reception section shown in FIG. 2, etc.

FIG. 6 is a rear view of the optical bus 30 mounted the signal processing section 22 and the transmission/reception section 40 therein shown in FIG. 2, etc.

As shown in FIGS. 5 and 6, the optical bus 30 actually is disposed in a back panel (not shown) in a cabinet of the base station 2 so that the signal processing section 22 (signal processing circuits 24) and the transmission/reception section 40 (transmission/reception circuits 42) can input and output optical signals from and to the optical bus 30.

Figure 7:
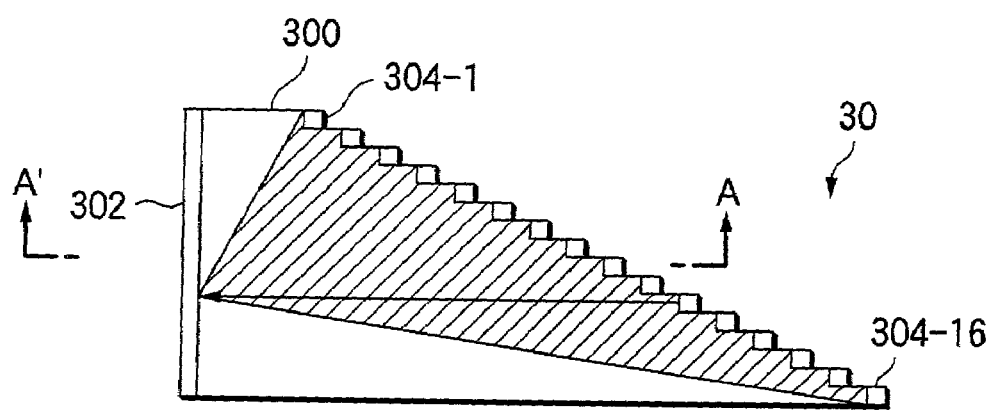
FIG. 7 is a drawing to show an optical signal guided into a light guide passage by a reflection section and reflected and dispersed by a diffuse reflection plate for transmission.

FIG. 7 is a drawing to show an optical signal guided into a light guide passage 300 by a reflection section 304 and reflected and diffused by a diffuse reflection plate 302 for transmission.

Figure 8:
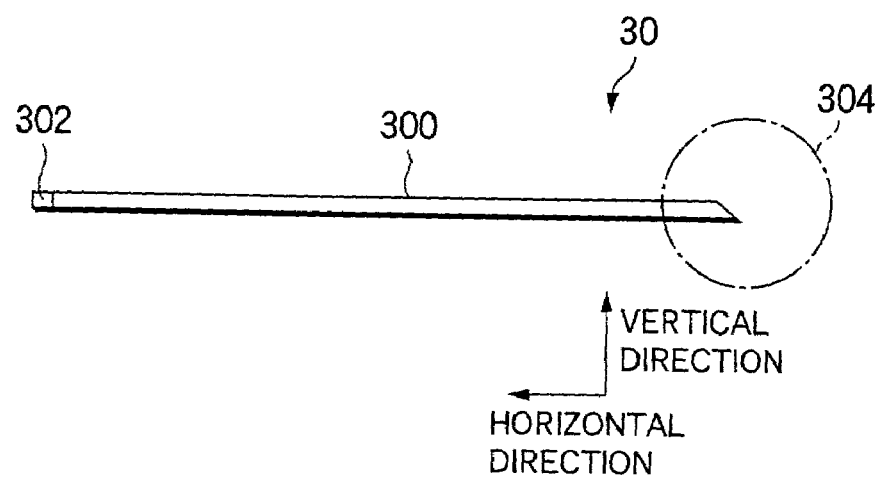
FIG. 8 is a sectional view of the optical bus shown in FIG. 2, etc.

FIG. 8 is a sectional view of the optical bus 30 taken by line A–A' in FIG. 7.

Figure 9:
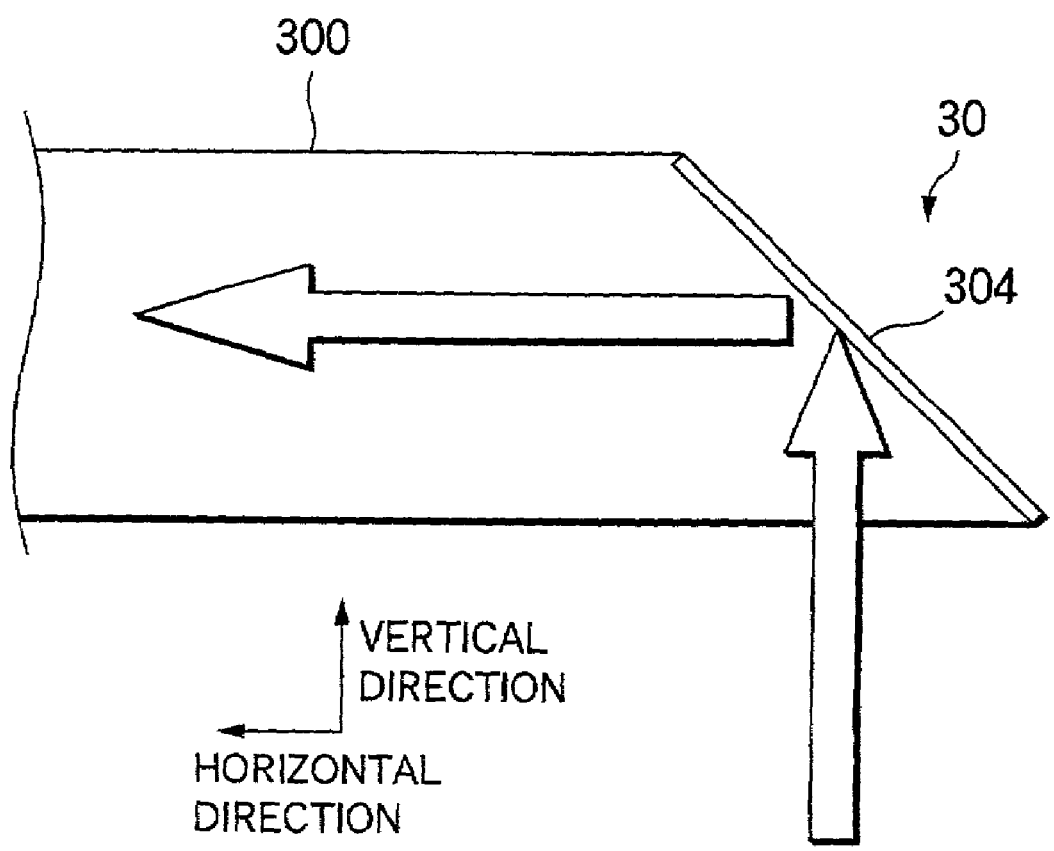
FIG. 9 is a drawing to show an optical signal reflected by the reflection section of the optical bus shown in FIG. 7 and guided into the light guide passage.

FIG. 9 is a drawing to show an optical signal reflected by the reflection section 304 of the optical bus 30 shown in FIG. 7 and guided into the light guide passage 300.

The optical bus 30 comprises the light guide passage 300, the diffuse reflection plate 302, and the reflection section 304, as shown in FIGS. 7 to 9.

The light guide passage 300 comprises a sheet-like polymethyl methacrylate (PMMA), etc., formed stepwise, as shown in FIGS. 6 and 7.

As shown in FIG. 7, the stepwise portion of the light guide passage 300 is provided with reflection sections 304-1 to 304-16 corresponding to boards of the signal processing circuits 24 and transmission/reception circuits 42, respectively and placed at positions where the reflection sections 304-1 to 304-16 can be input/can output optical signals from/to the signal processing circuits 24 and transmission/reception circuits 42.

Each of steps of the light guide passage 300 is formed to have an angle (for example, 45 degrees) so that an optical signal incident in a perpendicular direction to the light guide passage 300 from each of the boards of the signal processing section 22 (signal processing circuits 24; FIG. 2) and the transmission/reception section 40 (transmission/reception circuits 42) is reflected in a horizontal direction of the light guide passage 300 and is guided in a direction of the diffuse reflection plate 302 as indicated by arrows in FIG. 9, whereby the reflection section 304 shown in FIG. 8 is formed.

As shown in FIGS. 7 and 8, the diffuse reflection plate 302 for diffusing and reflecting the optical signal guided from the reflection section 304 as shown in FIG. 7 is placed on a side of the light guide passage 300 opposed to the reflection section 304.

The diffuse reflection plate 302 diffuses and reflects as hatched in FIG. 7 the optical signal incident from the reflection section 304, which is opposed to the EO conversion circuit 246 of the signal processing circuit 24 (transmission/reception circuit 42), and guided through the light guide passage 300 as indicated by an arrow in FIG. 7 (the transmission/reception circuit 42 has the EO conversion circuit 246 and the OE conversion circuit 262).

The optical signal diffused and reflected by the diffuse reflection plate 302 passes through a path opposite to that indicated by the arrows in FIG. 9 and is guided into the OE conversion circuit 262 of the transmission/reception circuit 42 (signal processing circuit 24).

Known multiplex transmission technologies of optical signals, such as wavelength multiplexing and intensity multiplexing, can be applied to transmission of the optical signal by the optical bus 30. It is possible to convert one multiplexed optical signal to a plurality of signals. On the other hand, it is also possible to multiplex a plurality of signals to generate one multiplexed optical signal.

A diffuse transmission film for transmitting and diffusing an optical signal rather than the diffuse reflection plate 302 for reflecting and diffusing an optical signal may be used depending on the configuration of the apparatus.

The optical bus 30 has the described configuration for optically connecting the signal processing circuits 24-1 to 24-8 and the transmission/reception circuits 42-1 to 42-8 and transmitting the optical transmission signals (transmission data), which are outputted from the signal processing circuits 24-1 to 24-8 to the optical bus 30, respectively, to all the transmission/reception circuits 42-1 to 42-8 in a non-block state.

In contrast, the optical bus 30 transmits the reception signals (reception data), which are outputted from the transmission/reception circuits 42-1 to 42-8 to the optical bus 30, respectively, to all the signal processing circuits 24-1 to 24-8 in a non-block state.

[Transmission/Reception Section 40 •Transmission/Reception Circuits 42]

Figure 10:
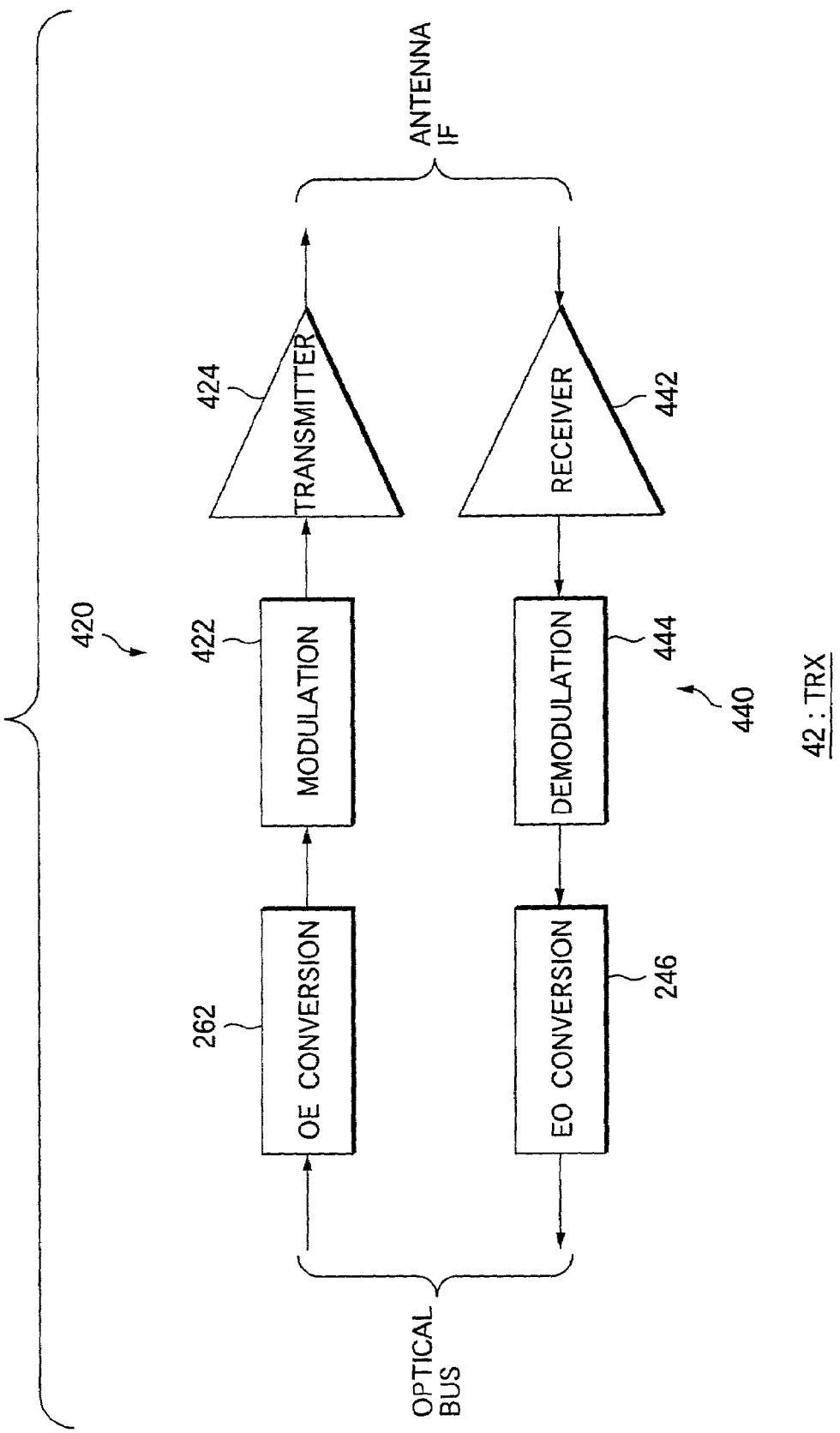
FIG. 10 is a drawing to show the configuration of the transmission/reception circuit shown in FIGS. 2 and 3.

FIG. 10 is a drawing to show a configuration of the transmission/reception circuit 42 shown in FIGS. 2 and 3.

Components identical with those of the signal processing circuit 24 previously described with reference to FIG. 4 are denoted by the same reference numerals in FIG. 10.

The transmission/reception section 40 comprises n transmission/reception circuits 42-1 to 42-n each housed in one board, for example, as shown in FIGS. 2 and 3 (in FIG. 2, n=8).

As shown in FIG. 10, the transmission/reception circuit 42 comprises a transmission channel 420 and a reception channel 440.

The transmission channel 420 comprises an OE conversion circuit 262, a modulator 422, and a transmitter 424.

The reception channel 440 comprises a receiver 442, a demodulator 444, and an EO conversion circuit 246.

As shown in FIGS. 3 and 4, the transmission/reception circuit 42 uses these components to receive transmission data in the one-bit serial format at 660 Mbps from the optical bus 30 (FIG. 2), to demodulate a carrier signal based on the received transmission data to generate a radio transmission signal fitted for the radio communication channel between the base station 2 and the mobile station 12 (FIG. 1), and to output the radio transmission signal to the antenna IF 50.

The transmission/reception circuit 42 receives the radio transmission signal from the antenna IF 50, performs demodulation of reception data in the one-bit serial format at 660 Mbps from the received radio transmission signal, and outputs the provided reception data to the optical bus 30.

[Transmission Channel 420]

In the transmission channel 420, the OE conversion circuit 262 converts the optical transmission signal input from the optical bus 30 into an electric signal and outputs the electric signal to the modulator 422 as transmission data in a one-bit serial format at 660 Mbps.

The modulator 422 modulates a carrier signal based on the transmission data input from the OE conversion circuit 262 to generate a modulation signal and outputs the modulation signal to the transmitter 424.

The transmitter 424 performs amplification, frequency modulation, etc., of the modulation signal input from the modulator 422 to generate a radio transmission signal fitted for the radio communication channel between the base station 2 and the mobile station 12 (FIG. 1), and outputs the radio transmission signal to the antenna IF 50.

[Reception Channel 440]

In the reception channel 440, the receiver 442 performs amplification, frequency modulation, etc., of the radio reception signal input from the antenna IF 50 to generate a modulation signal fitted for the demodulator 444.

The demodulator 444 demodulates the modulation signal input from the receiver 442 and outputs the demodulated signal to the EO conversion circuit 246 as reception data in a one-bit serial format at 660 Mbps.

The EO conversion circuit 246 converts the electric reception data input from the demodulator 444 into an optical reception signal and outputs the optical reception signal to the optical bus 30.

[Antenna System 52]

The antenna system 52 contains a plurality of antennas (only one is shown in FIG. 2) for transferring radio transmission signals and radio reception signals to and from the mobile stations 12.

[Antenna IF 50]

The antenna IF 50 distributes the radio reception signals input from the plurality of antennas contained in the antenna system 52 to the transmission/reception circuits 42 of the transmission/reception section 40.

The antenna IF 50 distributes the radio is input from the signal processing section 22 a plurality of signals, which is input to the transmission/reception section 40 and distributes the plurality of signals to the plurality of antennas included in the antenna system 52.

[Operation of Base Station 2 (Transmission Operation)]

A general operation of the base station 2 is as follows:

To begin with, a transmission operation of the base station 2 will be discussed.

The network IF 20 (FIG. 2) receives transmission data from the network 10 and distributes the transmission data to the signal processing circuits 24-1 to 24-8 of the signal processing section 22.

The transmission channel 240 (FIG. 4) of the signal processing circuit 24 codes the transmission data input from the network IF 20 and outputs the coded data to the reflection section 304 of the optical bus 30 as an optical transmission signal.

The reflection section 304 of the optical bus 30 (FIGS. 7 to 9) reflects the optical transmission signal incident in the perpendicular direction to the light guide passage 300 from the signal processing circuit 24 (FIG. 2) in the horizontal direction of the light guide passage 300 and guides the optical transmission signal in the direction of the diffuse reflection plate 302.

The diffuse reflection plate 302 (FIGS. 7 to 9) diffuses and reflects the transmission signal guided through the light guide passage 300 as hatched in FIG. 7.

The light guide passage 300 guides the transmission signal diffused and reflected by the diffuse reflection plate 302 into the transmission/reception circuit 42.

The transmission/reception circuit 42 converts the optical transmission signal guided through the optical bus 30 into electric transmission data, modulates a carrier signal based on the transmission data to generate a radio transmission signal fitted for the radio communication channel between the base station 2 and the mobile station 12 (FIG. 1), and outputs the radio transmission signal to the antenna IF 50.

The antenna IF 50 distributes the radio transmission signals input from the signal processing circuits 24 to the antennas of the antenna system 52 and the antennas of the antenna system 52 transmits the distributed radio transmission signals via the radio communication channels to the mobile stations 12.

[Reception Operation]

Next, a reception operation of the base station 2 will be discussed.

The mobile station 12 transmits a radio reception signal to the base station 2 via the radio communication channel.

The antenna of the antenna system 52 receives the radio reception signal from the mobile station 12 (FIG. 1) and outputs the radio reception signal to the antenna IF 50.

The antenna IF 50 distributes the radio reception signal from the antenna system 52 to the transmission/reception circuits 42-1 to 42-8.

The reception channel 440 of the transmission/reception circuit 42 (FIG. 10) demodulates the radio reception signal input from the antenna IF 50 into electric reception data, converts the reception data into an optical reception signal, and outputs the optical reception signal to the optical bus 30.

The optical bus 30 transmits the optical reception signal from the transmission/reception circuit 42 to the signal processing circuit 24.

The signal processing circuit 24 converts the optical reception signal input from the optical bus 30 into electric reception data, decodes the data, and outputs the decoded data to the network IF 20.

The network IF 20 (FIG. 3) transmits the reception data input from the signal processing circuit 24 to another base station 2 through the network 10 (FIG. 1).

[Advantages of Base Station 2]

Figure 11:
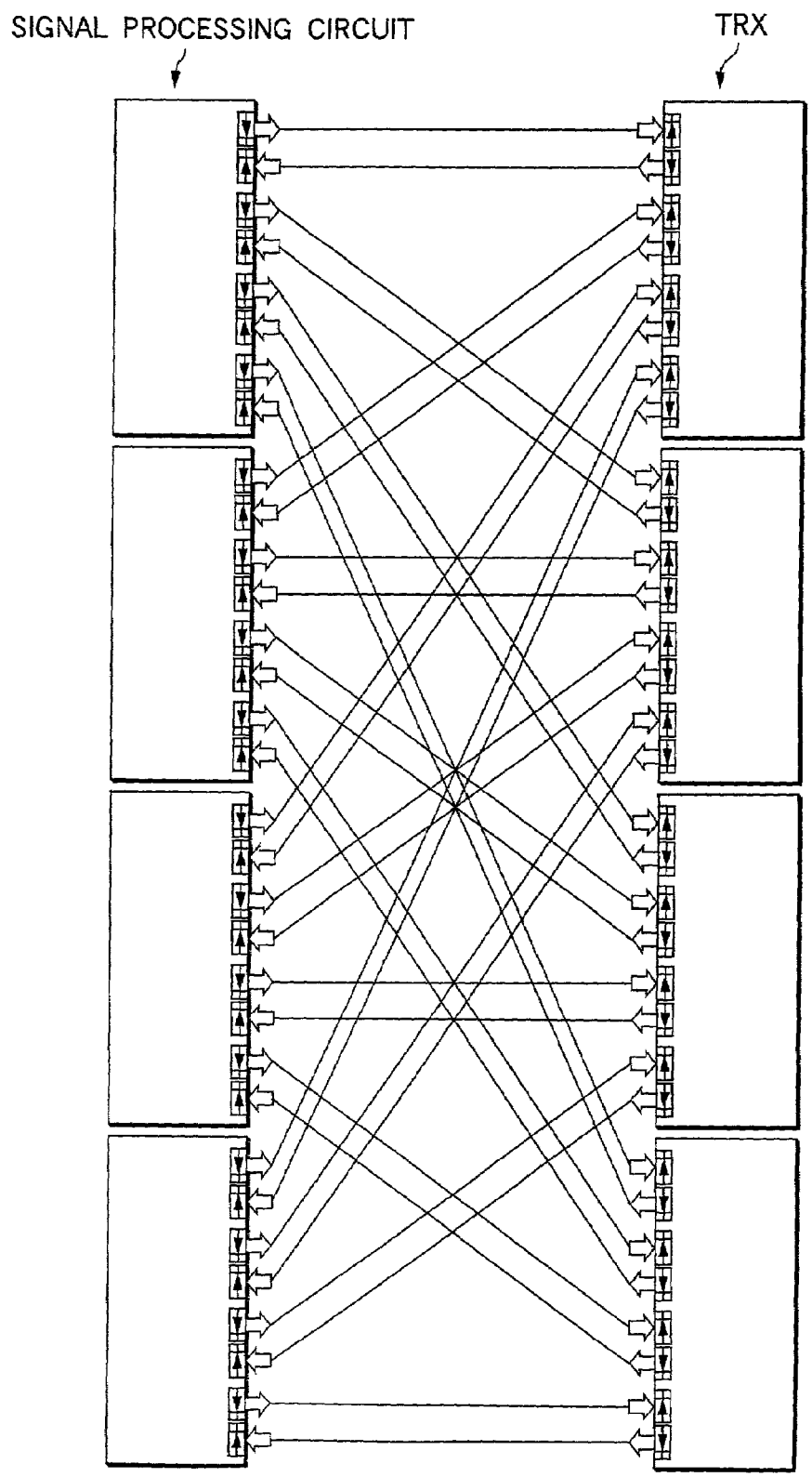
FIG. 11 is a drawing to illustrate the configuration wherein four signal processing circuits and four transmission/reception circuits are connected in a point-to-point way without using the optical bus.

FIG. 11 is a drawing to illustrate a configuration wherein four signal processing circuits and four transmission/reception circuits are connected in a point-to-point way without using the optical bus according to the invention.

As illustrated in FIG. 11, if two metallic cables or optical cables are installed between each signal processing circuits and each transmission/reception circuit to connect the signal processing circuits and the transmission/reception circuits in a non-block state, the wiring amount becomes very large.

The signal processing circuits and the transmission/reception circuits shown in FIG. 11 require each four OE conversion circuits and four EO conversion circuits although the OE and EO conversion circuit are not shown for simplicity.

As compared with the configuration, according to the invention, the signal processing circuits 24 and the transmission/reception circuits 42 are connected by the optical bus 30, so that the wiring amount and the number of the EO and OE conversion circuits can be drastically decreased, as shown in FIG. 4.

Figure 12:
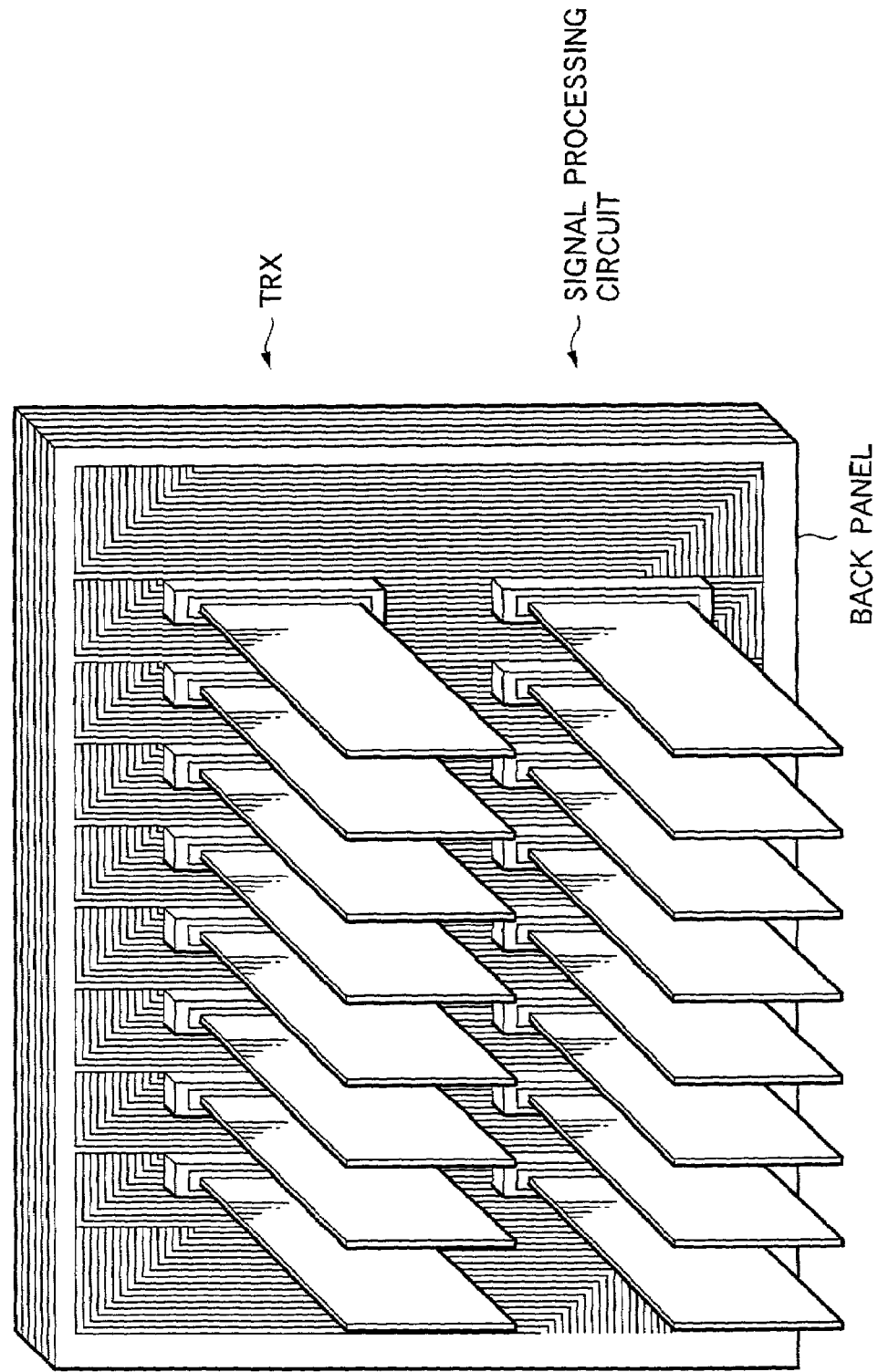
FIG. 12 is a drawing to illustrate connecting of the signal processing circuits and the transmission/reception circuits by wiring on a back panel.

FIG. 12 is a drawing to illustrate connecting of the signal processing circuits 24 and the transmission/reception circuits 42 by wiring on a back panel.

As illustrated in FIG. 12, if the signal processing circuits and the transmission/reception circuits are connected by wiring on the back panel, the wiring on the back panel becomes very complicated and moreover the back panel needs to be made very multiple layers.

As compared with the configuration, the optical bus 30 makes it possible to simplify the wiring between the signal processing circuits 24 and the transmission/reception circuits 42 and moreover to lessen the number of back panel layers, as shown in FIGS. 5 and 6.

FIRST MODIFIED EXAMPLE

Figure 13:
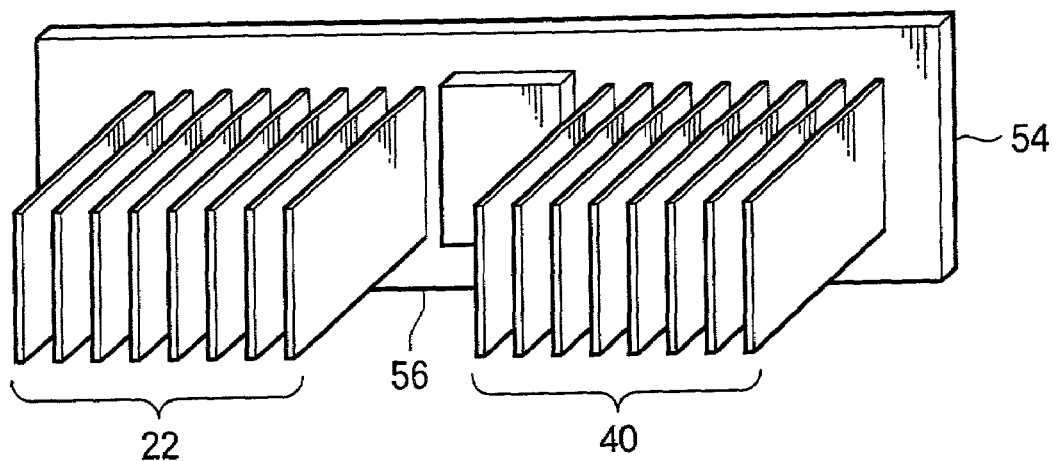
FIG. 13 is a first drawing to show a first modified example of the base station shown in FIG. 2.
Figure 14:
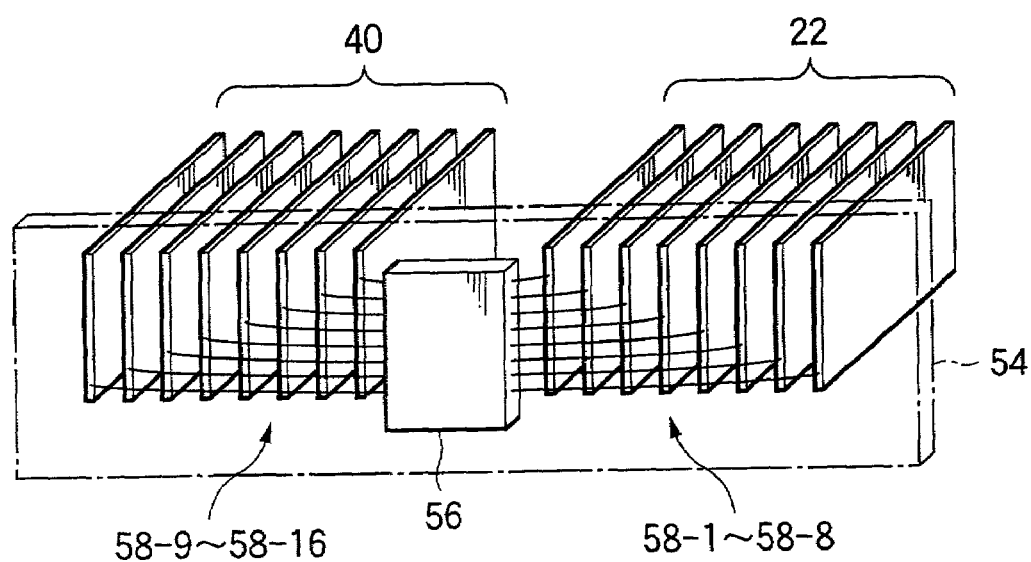
FIG. 14 is a second drawing to show the first modified example of the base station shown in FIG. 2.

FIGS. 13 and 14 are first and second drawings to show a first modified example of the base station 2 shown in FIG. 2.

As shown in FIGS. 13 and 14, if a rectangular light guide passage 56 is disposed on a back panel 54 in place of the stepwise light guide passage 300 of the optical bus 30 shown in FIG. 7 and the light guide passage 56 and the signal processing section 22 (signal processing circuits 24) and the transmission/reception section 40 (transmission/reception circuits 42) are connected by optical fibers 58-1 to 58-16, a similar advantage to that of the base station 2 shown in FIG. 2 can be provided.

Figure 15:
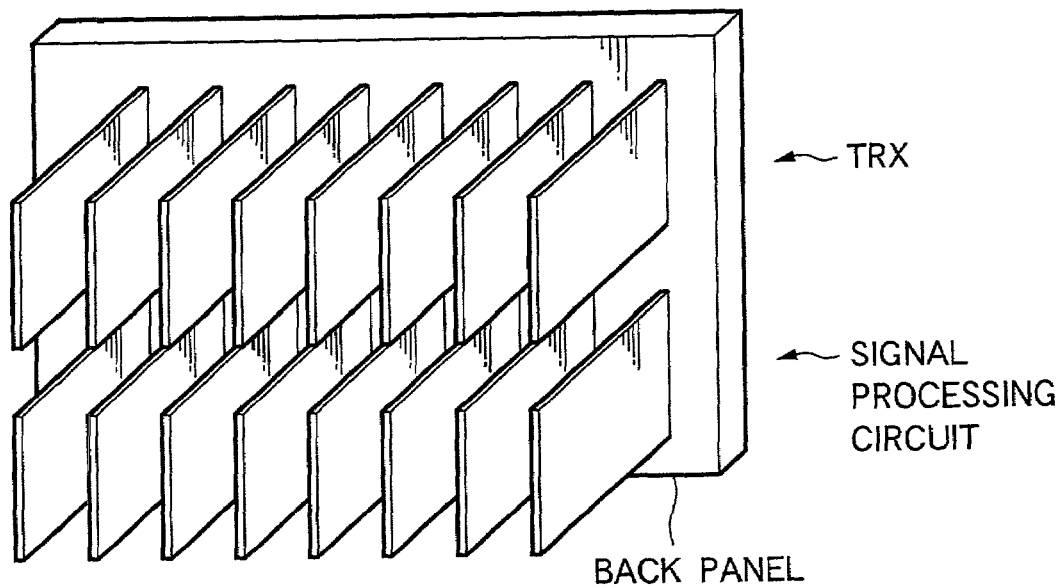
FIG. 15 is a first drawing to show how the base station shown in FIGS. 13 and 14 is configured without using a light guide passage.
Figure 16:
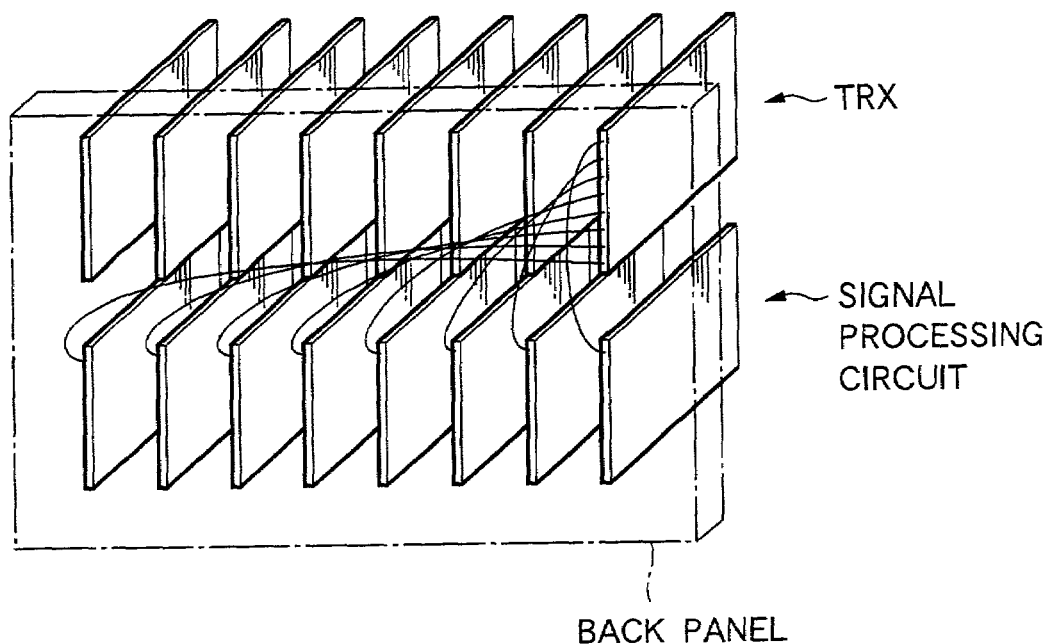
FIG. 16 is a second drawing to show how the base station shown in FIGS. 13 and 14 is configured without using the light guide passage.

At the time, if a translucent optical diffusion film (not shown) for diffusing optical signals is placed between the optical fibers 58 to introduce signals from the boards of the EO conversion circuits 246 of the signal processing circuit 24 and the transmission/reception circuit 42 (FIGS. 4 and 10) into the light guide passage 56 and the light guide passage 56, the optical signals incident from the optical fibers 58 can be widely diffused and efficiently transmitted to other boards FIGS. 15 and 16 are first and second drawings to show how the base station 2 shown in FIGS. 13 and 14 is configured without using the light guide passage 56.

If the base station 2 shown in FIGS. 13 and 14 is configured without using the light guide passage 56 as shown in FIGS. 15 and 16, it becomes necessary to run optical fibers from each transmission/reception circuit to all signal processing circuits as shown in FIG. 16.

Therefore, if the base station 2 is configured as shown in FIGS. 15 and 16, the wiring amount becomes very large as compared with the case shown in FIGS. 13 and 14, and moreover the number of the OE conversion circuits and the EO conversion circuits to be provided on the boards of the signal processing circuit and the transmission/reception circuit are increased as with the case shown in FIG. 11.

SECOND MODIFIED EXAMPLE

Figure 17:
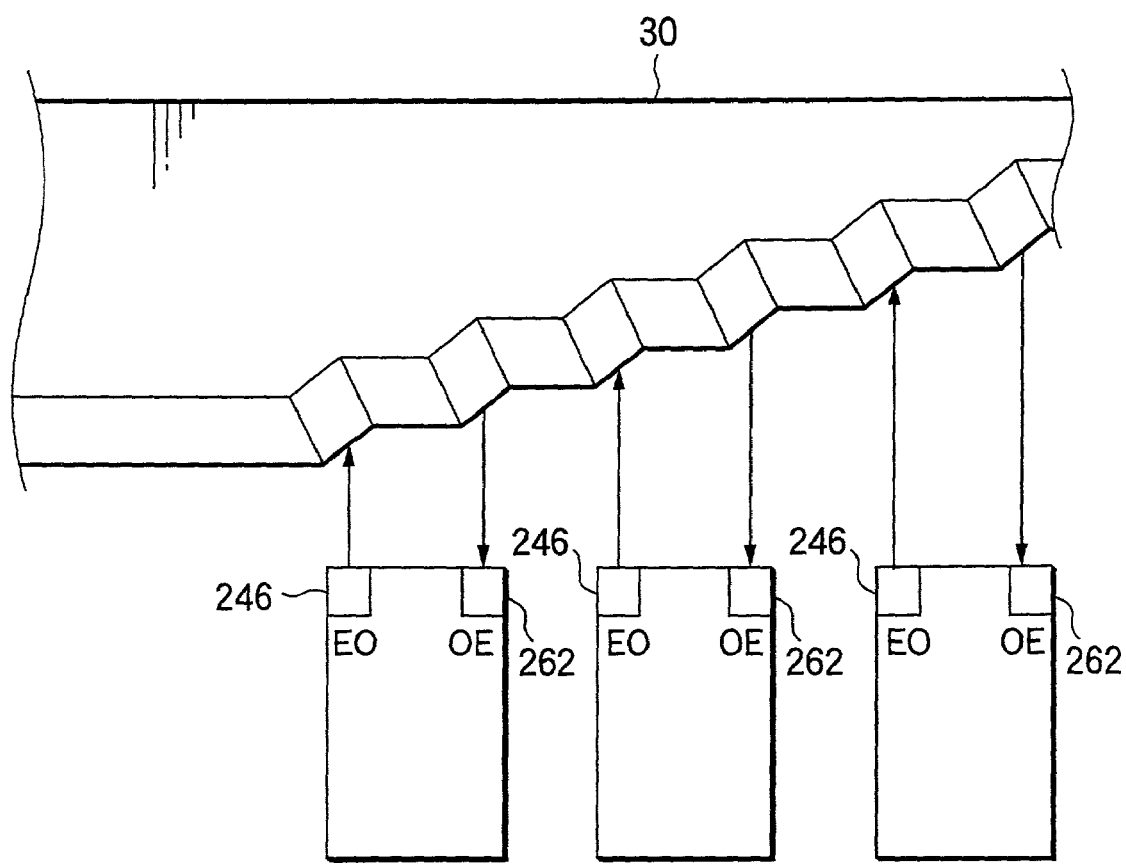
FIG. 17 is a drawing to show a second modified example of the base station shown in FIG. 2.

FIG. 17 is a drawing to show a second modified example of the base station shown in FIG. 2.

FIGS. 7 to 9 illustrate the case where the EO conversion circuit 246 and the OE conversion circuit 262 (FIGS. 4 and 10) share one reflection section 304. However, as shown in FIG. 17, the optical bus 30 may be configured so that one reflection section 304 is provided for one EO conversion circuit 246 and one reflection section 304 for one OE conversion circuit 262.

If the optical bus 30 is thus configured, leakage of an optical signal from the EO conversion circuit 246 provided on one board to the OE conversion circuit 262 provided on the same board can be decreased drastically and the transmission performance of the optical bus 30 can be enhanced.

THIRD MODIFIED EXAMPLE

FIG. 18 is a drawing to show a third modified example of the base station shown in FIG. 2.

As shown in FIG. 18, if the signal processing section 22 (signal processing circuits 24) and the transmission/reception section 40 (transmission/reception circuits 42) are replaced with a signal processing section 60 and a transmission/reception section 62 capable of transmitting a plurality of optical signals in parallel and as many optical buses 30-1 to 30-16 as the number corresponding to the number of signals transmitted by the signal processing section 60 and the transmission/reception section 62 are used, a plurality of optical signals can be transmitted in parallel in the base station 2.

If the base station 2 is thus configured, the data transmission speed between the signal processing circuit and the transmission/reception circuit can be increased.

FOURTH MODIFIED EXAMPLE

FIG. 19 is a drawing to show a fourth modified example of the base station 2 shown in FIG. 2.

As shown in FIG. 19, if the signal processing section 22 (signal processing circuits 24) and the transmission/reception section 40 (transmission/reception circuits 42) are replaced with a signal processing section 60 and a transmission/reception section 62 capable of transmitting a plurality of optical signals in parallel as with the case in FIG. 18, and as many rectangular light guide passages 56-1 to 56-8 as the number corresponding to the number of signals transmitted by the signal processing section 60 and the transmission/reception section 62 are used and they are connected by optical fibers 64-1 to 64-256 (256=number of signal processing circuits and transmission/reception circuits (16)× number of parallel signals (8)×2), a plurality of optical signals can be transmitted in parallel in the base station 2.

If the base station 2 is thus configured, the data transmission speed between the signal processing circuit and the transmission/reception circuit can be increased as with the case shown in FIG. 18.

As described above, the radio communication apparatus according to the invention makes it possible to decrease the number of wires between signal processing units and radio signal transmission/reception units in each base station of a mobile communication system.

The radio communication apparatus according to the invention makes it possible to reduce the number of wires and the thickness of a back panel for connecting signal processors and radio transceivers in each base station of a mobile communication system.

The radio communication apparatus according to the invention makes it possible to eliminate a pin bottleneck of connectors for fixing signal processors and radio signal transceivers to a back panel to decrease the force required for inserting or removing each board in each base station of a mobile communication system.

What is claimed is:

1. A radio communication apparatus comprising:
   a plurality of radio signal reception boards adapted to receive radio reception signals from communication channels, wherein each radio signal reception board demodulates the received radio reception signals into first electric signals, and each radio signal reception board comprises thereon a first photoelectric conversion element that converts the first electric signals into first optical signals;
   a plurality of reception signal processing boards; and
   an optical transmission section adapted to optically transmit the first optical signals emitted by the first photoelectric conversion element of each radio signal reception board to the plurality of reception signal processing boards, wherein:
   each reception signal processing board processes the first optical signals received from the optical transmission section;
   the optical transmission section comprises one sheet-shaped optical bus comprising:
      a light guide passage;
      a plurality of reflection portions, each reflection portion optically reflecting the first optical signals, which are incident thereon and are input from the first photoelectric conversion element of the corresponding radio signal reception board, towards a predetermined direction; and
      a diffusion reflection plate that reflects the first optical signals reflected by the reflection portions while diffusing the reflected first optical signals, and
      the diffusion reflection plate is disposed on one end of the light guide passage to face the reflection portions.

2. The radio communication apparatus according to claim 1, wherein the sheet-shaped optical bus comprises stepwise portions that input and/or output an optical signal.

3. A radio communication apparatus comprising:
   a plurality of transmission signal processing boards adapted to process first electric signals, wherein each transmission signal processing board comprises a first photoelectric conversion element that converts the processed first electric signals into first optical signals;
   a plurality of radio signal transmission boards; and
   an optical transmission section adapted to optically transmit the first optical signals emitted by the first photoelectric conversion element of each transmission signal processing board to the plurality of radio signal transmission boards, wherein:
   each radio signal transmission board converts the first optical signals received from the optical transmission section into second electric signals and transmits the second electric signals to radio communication channels;
   the optical transmission section comprises one sheet-shaped optical bus comprising:
      a light guide passage;
      a plurality of reflection portions, each reflection portion optically reflecting the first optical signals, which are incident thereon and are input from the first photoelectric conversion element of the corresponding transmission signal processing board, towards a predetermined direction; and
      a diffusion reflection plate that reflects the first optical signals reflected by the reflection portions while diffusing the reflected first optical signals, and
      the diffusion reflection plate is disposed on one end of the light guide passage to face the reflection portions.

4. The radio communication apparatus according to claim 3, wherein the sheet-shaped optical bus comprises stepwise portions that input and/or output an optical signal.

5. A radio communication apparatus comprising:
   a plurality of radio signal reception boards adapted to receive radio reception signals from communication channels, wherein each radio signal reception board demodulates the received radio reception signals into first electric signals, and each radio signal reception board comprises thereon a first photoelectric conversion element that converts the first electric signals into first optical signals;
   a plurality of reception signal processing boards;
   a plurality of transmission signal processing boards adapted to process second electric signals, wherein each transmission signal processing board comprises a second photoelectric conversion element that converts the processed second electric signals into second optical signals;
   a plurality of radio signal transmission boards; and
   an optical transmission section adapted to optically transmit the first optical signals emitted by the first photoelectric converstin element of each radio signal reception board to the plurality of reception signal processing boards and to optically transmit the second optical signals emitted by the second photoelectric conversion element of each transmission signal processing board to the plurality of radio signal transmission boards, wherein:
   each reception signal processing board processes the first optical signals received from the optical transmission section;
   each radio signal transmission board converts the second optical signals received from the optical transmission section into third electric signals and transmits the third electric signals to radio communication channels; and
   the optical transmission section comprises one sheet-shaped optical bus comprising:
      a light guide passage;
      a plurality of reflection portions, each reflection portion optically reflecting the first and second optical signals, which are incident thereon and are input from the first and second photoelectric conversion elements of the corresponding radio signal reception and transmission signal processing boards, towards a predetermined direction; and
      a diffusion reflection plate that reflects the first and second optical signals reflected by the reflection portions while diffusing the reflected first and second optical signals, and
      the diffusion reflection plate is disposed on one end of the light guide passage to face the reflection portions.

6. The radio communication apparatus according to claim 5, wherein the sheet-shaped optical bus comprises stepwise portions that input and/or output an optical signal.

* * * * *